Dec. 14, 1948.    I. W. DOYLE    2,456,053
CAMERA LENS MOUNT
Filed April 20, 1945    2 Sheets-Sheet 2
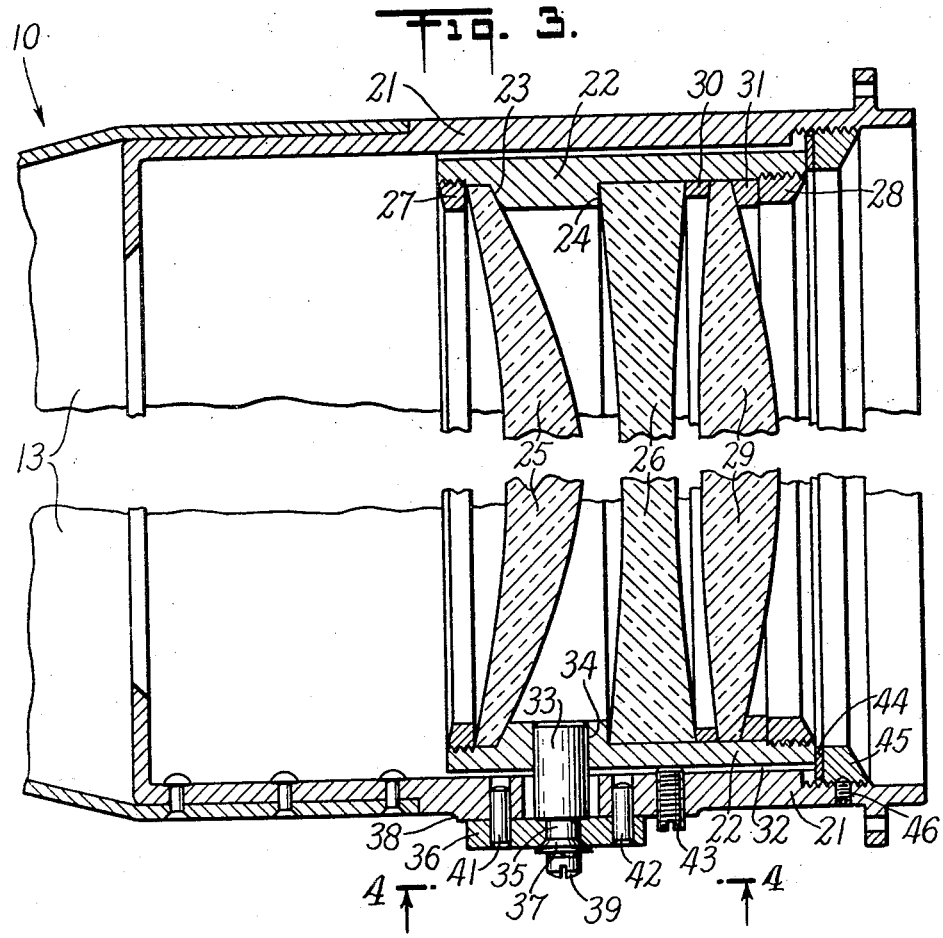
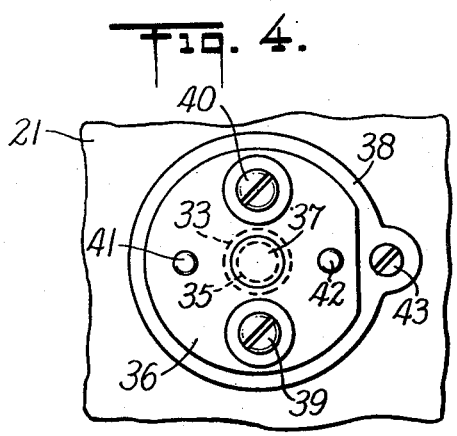
INVENTOR
*Irving W. Doyle*
BY
*Blair, Curtis + Hayward*
ATTORNEYS Patented Dec. 14, 1948

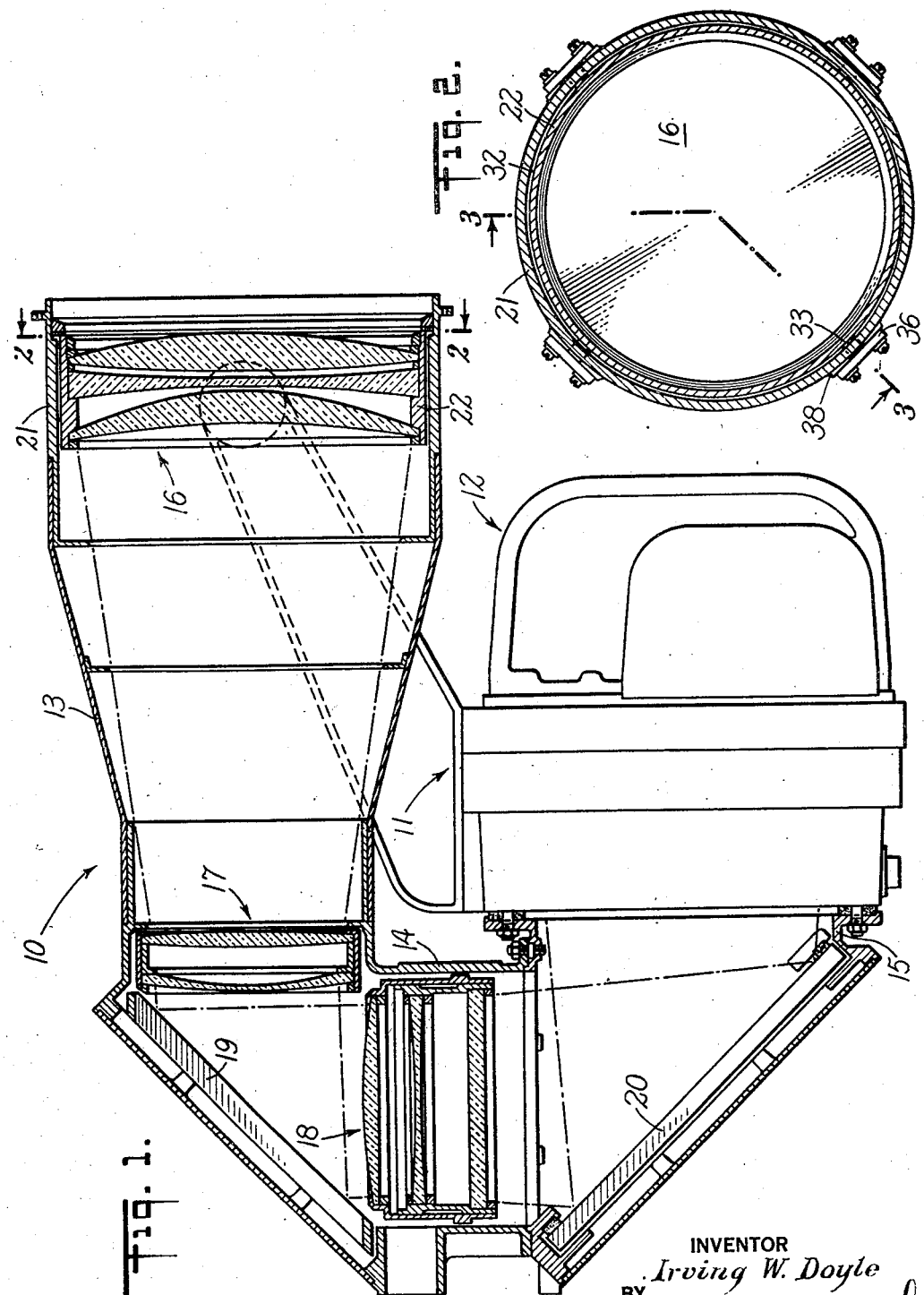

2,456,053

UNITED STATES PATENT OFFICE 2,456,053

CAMERA LENS MOUNT

Irving W. Doyle, Massapequa, N. Y., assignor to Fairchild Camera and Instrument Corporation, Jamaica, N. Y., a corporation of Delaware Application April 20, 1945, Serial No. 589,350

7 Claims. (Cl. 88—57)

1

This invention relates to a lens mount for a camera.

Among the various problems encountered in connection with the optical system of a camera is that of mounting the lens or lenses in such a way that stresses on the camera will not be transferred to the optical elements, and that the alignment of the optical elements of the lens system will be maintained regardless of the conditions attendant to use of the camera. In certain types of cameras, for example, large aerial cameras which are characterized by complex lens systems of substantial focal length, it is not unusual for such lens systems to include a plurality of groups of optical elements the optical axis of which is sometimes rectilinear and sometimes not. Where there occurs such plurality grouping of lens elements, which incidentally are often of substantial diameter, it is extremely difficult to maintain the alignment of the optical elements where the camera structure, e. g., the cone which holds the optical system, undergoes dimensional changes or becomes distorted by reason of factors of expansion or contraction resulting from wide and sudden temperature variations. This is particularly true in aerial cameras which are operated at low and extremely high altitudes and accordingly are subject to very substantial temperature variations.

Then too, if the frangible optical elements of the lens system are directly subjected to stresses from the camera cone, resulting from temperature expansion and contraction factors, the optical elements, having a thermal coefficient of expansion different from that of the material in the cone, are apt to crack or chip or become displaced from their proper operative position in relation to the optical axis of the lens system.

It is accordingly among the objects of this invention to provide a lens mount by which all stress on the optical elements which might result from factors of expansion or contraction due to temperature variations of the camera structure is absorbed or relieved. It is a further object of this invention to provide a lens mount by which the alignment of the several optical elements of the lens system is maintained regardless of dimension changes of the mounting structure from the factors of expansion or contraction resulting from temperature variations. A further object is to provide a lens mounting structure by which the lens unit may be readily removed from or installed in the camera. Other objects will be in part apparent and in part pointed out hereinafter.

According to one embodiment of my invention, the optical elements of the lens system are mounted in a barrel fabricated from a material having a thermal coefficient expansion which is of substantially the same value as that of the glass forming the optical elements. The barrel is, in turn, mounted in the camera cone or other supporting structure in such a manner that there is an annular space between the outer diameter of the lens barrel and the inner diameter of the supporting structure, the barrel being maintained in this position by supporting devices capable of accommodating relative expansion or contraction of the camera cone with respect to the lens barrel, so that the lens barrel is always held concentric with the axis of the supporting cone.

In the drawing,

Figure 1 is an elevation, partly in section, illustrative of a camera having a lens system characterized by lens mounts embodying one form of my invention;

Figure 2 is a section taken along the line 2—2 of Figure 3;

Figure 3 is an enlarged, staggered section taken along the line 3—3 of Figure 2; and, Figure 4 is a fragmentary elevation of a portion of the lens mount supporting structure as viewed along the line 4—4 of Figure 3.

Similar reference characters refer to similar parts throughout the views of the drawing.

Referring now to the drawing, the camera shown in Figure 1 is of a U-type construction, comprising a cone generally indicated at 10, a case or body generally indicated at 11, and a magazine generally indicated at 12. The cone 10 includes a plurality of separable sections 13, 14 and 15, in which the optical system of the camera is mounted. This optical system comprises illustratively three groups of lens elements generally indicated at 16, 17 and 18, respectively, a mirror 19 being related to groups 17 and 18, while a mirror 20 relates group 18 to the focal plane of the camera. While I have shown the several groups of optical elements, the following description will be confined to group 16, as the several groups, while differing somewhat in structural details, are all essentially the same in so far as the invention herein is concerned.

As shown in Figure 3, lens cone section 13 includes a cylinder 21, within which the group 16 of optical elements is mounted. This group 16 includes a metallic barrel 22, shouldered as at 23 and 24 to provide spaced abutments against which lenses 25 and 26 are held. Lens 25 is held against its shoulder 23 by a ring 27, which is threaded into the left-hand end of barrel 22. Lens 26 is in turn held against its shoulder 24 by a ring 28 threaded into the right-hand end of barrel 22, another lens 29 being disposed between ring 28 and lens 26 and held in proper spaced relation thereto by suitable spacers 30 and 31.

As noted hereinabove, it is desirable that the thermal coefficient of expansion of the optical elements, i. e. the lenses, be approximately of the same value as that of the structure which directly supports the lenses. To this end, lens barrel 22, rings 27 and 28 and spacers 30 and 31 are formed preferably from a metal which expands or contracts at substantially the same rate as do the lenses 25, 26 and 29. There being then no difference between the rates of expansion or contraction of the lenses and the several parts in direct engagement therewith, the lenses are not subject to any stresses resulting from a differential in radial or axial expansion or contraction.

As is more clearly shown in Figure 2, the outside diameter of barrel 22 of lens group 16 is less than the inside diameter of cone section 21, so that there is a space 32 between the lens barrel and cone. As hereinbefore noted, the lens group is supported in the cone concentrically therewith, to which end I have provided a plurality of pins or studs 33, illustratively four in number, arranged in quadrature. As is more clearly shown in Figure 3, each of these pins 33 extends through a radial hole 34 drilled in lens barrel 22, with which holes the pins have close fits, thus to maintain the lens barrel in accurate concentricity with the axis of the camera cone, and accordingly to maintain critical performance of the optical elements. These pins 33 are formed of the same material as lens barrel 22 so as to expand and contract at the same rate as the barrel, thus preventing binding of the pins in their holes 34. Pin 33 includes a neck 35 of reduced diameter which extends through a fastening plate 36, the pin neck being headed over as at 37 to fasten the pin and plate securely together. The plate 36 is, in turn, secured to a boss 38 on cone section 21 as by screws 39 and 40 (see Figure 4). At the time the optical elements are assembled to the camera cone, the several pins 33 may be shifted about slightly in order to attain the desired concentricity of the lens group 16 and cone section 21. When this condition has been attained, the pin carrying plates 36 are secured permanently in their proper position as, for example, by dowels 41 and 42, after which the screws 39 and 40 are tightened.

With the pins 33 set or adjusted as just described and securely fastened in place, it will be apparent that any relative expansion or contraction of the camera cone section 21 relative to lens barrel 22 will necessarily be in a radial direction and accordingly can result in nothing more than a sliding of the pins 33 within their holes 34. Because of the provision of the annular space 32 between the cone and lens barrel, these two parts never engage one another and accordingly any differential in the thermal coefficient of expansion of such parts is accommodated by the sliding of pins 33 in holes 34, no stresses being exerted on lens barrel 22 which otherwise might well be transferred thereby to the contained lenses.

It might be noted that each of bosses 38 is drilled to receive a set screw 43 by which the lens group 16 is initially adjusted to its concentric relationship with cone section 21. After the lens group has been set in this position, as hereinbefore described, these screws 43 may be removed and their holes plugged in any suitable manner.

In order to preclude the entrance of dust or other foreign particles into the lens cone through the space 32 between the cone and the lens barrel 22, I have preferably provided a washer 44 of any suitable material which is pressed against the right-hand end of lens barrel 22 by a ring 45 which is threaded into lens cone section 21 and held in proper position by one or more set screws 46.

It will now appear (referring to Figure 1) that with the several lens groups 16, 17 and 18 mounted in lens cone 10 in the manner hereinbefore described with respect to lens group 16, each of the groups is maintained in proper alignment with respect to the others and with respect to the optical axis of the camera, regardless of any distortion or dimensional variation in the camera cone as a result of extreme temperature variations. It may further be seen that in the event of any such cone distortion or dimension variation, stresses resulting therefrom are not transferred or exerted on the optical elements themselves, with the result that there is little or no danger of damage to the optical elements, at least from this cause.

Thus the several objects set forth hereinabove have been attained in a thoroughly practical and efficient manner.

As many possible embodiments may be made of the above invention, and as many changes might be made in the embodiment above set forth, it is to be understood that all matter hereinbefore set forth or shown in the accompanying drawing is to be interpreted as illustrative and not in a limiting sense.

I claim:

1. In a camera lens mount, the combination of, a housing, an optical element, a barrel whose outer diameter is less than the inner diameter of the housing for supporting said optical element disposed in said housing and forming an annular space with the inner surface thereof, and means including a plurality of projections secured to said housing in a plane normal to the optical axis and extending radially therefrom into cooperating apertures in said barrel and in slidable engagement therewith for securing said barrel in said housing, whereby said barrel is free to expand radially within said housing but is restrained from axial movement relative thereto, whereby the optical axis of said optical element is held coincident with the axis of said housing.

2. Apparatus according to claim 1 wherein the means which secures the barrel to the housing includes three or more pins secured to the housing and extending inwardly thereof and slidably fitting into holes in the barrel, and means for detachably securing said pins to said housing.

3. Apparatus according to claim 1 wherein the means which secures the barrel to the housing includes three or more pins secured to the housing and extending inwardly thereof into holes in the barrel, means for detachably securing said pins to said housing, and locating means for said securing means, said pins and holes having a close but sliding fit so that any relative movement between the housing and barrel is confined to radial directions.

4. In a camera lens mount, the combination of, a housing, an optical element, a barrel for supporting said optical element disposed in said housing and forming an annular space with the nner surface thereof, and means for securing said barrel in said housing for radial movement only relative thereto, said securing means including three or more pins secured to said housing and extending radially inwardly thereof and slidably fitting into holes in said barrel.

5. In a camera lens mount, the combination of, a housing, a plurality of lenses, a lens barrel, means mounting said lenses in stationary positions in said barrel, the thermal coefficients of expansion of said lenses and said barrel being substantially the same but being different from that of said housing, the outside diameter of said barrel being less than the inside diameter of said housing so that an annular space is formed between the two, and means including a plurality of projecting members carried by said housing and extending therethrough and inwardly radially thereof and projecting into said barrel to hold said barrel in said housing against axial movement relative thereto while permitting radial expansion or contraction thereof.

6. In a camera lens mount, the combination of, a housing, a plurality of lenses, a lens barrel, means mounting said lenses in stationary positions in said barrel, the thermal coefficients of expansion of said lenses and said barrel being substantially the same but being different from that of said housing, the outside diameter of said barrel being less than the inside diameter of said housing so that an annular space is formed between the two, and three or more pins secured to said housing and extending inwardly thereof into holes in said barrel for supporting said barrel in said housing against axial but not against radial movement thereof relative to the housing.

7. In a camera lens mount, the combination of, a housing, a plurality of lenses, a lens barrel, means mounting said lenses in stationary positions in said barrel, the thermal coefficients of expansion of said lenses and said barrel being substantially the same but being different from that of said housing, the outside diameter of said barrel being less than the inside diameter of said housing so that an annular space is formed between the two, and three or more pins secured to said housing and extending inwardly thereof into holes in said barrel for supporting said barrel in said housing against axial but not against radial movement thereof relative to the housing, the material of which said pins are formed having a thermal coefficient of expansion which is the same as the material of said barrel.

IRVING W. DOYLE.

REFERENCES CITED

The following references are of record in the file of this patent:

UNITED STATES PATENTS

| Number | Name | Date |
|---|---|---|
| 1,290,777 | O'Brien | Jan. 7, 1919 |
| 1,325,936 | Fouasse | Dec. 23, 1919 |
| 1,791,254 | Von Brockdorff | Feb. 3, 1931 |
| 1,883,673 | Fouquet | Oct. 18, 1932 |
| 2,008,991 | Nowack | July 23, 1935 |
| 2,219,224 | French | Oct. 22, 1940 |
| 2,314,838 | Kingston | Mar. 23, 1943 |
| 2,330,663 | Bennett et al. | Sept. 28, 1943 |